3,336,279
POLYMERIZATION OF VINYL AMINO COMPOUNDS WITH π COMPLEX-FORMING ELECTRON ACCEPTOR COMPOUNDS
Harvey Scott, Cherry Hill, N.J., assignor to The Franklin Institute, Philadelphia, Pa., a corporation of Pennsylvania
No Drawing. Filed Apr. 8, 1964, Ser. No. 358,409
20 Claims. (Cl. 260—88.3)

ABSTRACT OF THE DISCLOSURE

The polymerization of vinyl amino compounds is initiated by contacting the compound with an organic π complex-forming electron acceptor compound.

---

The present invention relates to a novel method of polymerizing vinyl amino compounds; and, more particularly, the present invention relates to a novel method of initiating catalytically the polymerization of vinyl amino compounds at low temperatures with a catalyst that is stable, readily available and is non-acid.

Vinyl amino compounds, exemplified by the N-vinyl amines, like N-vinyl carbazole, N-vinyl pyrrole and N-vinyl indole; the vinyl pyridines and the amino-substituted styrenes, are most commonly polymerized through free radical- or cationic catalysis. In the first, a per-oxygen compound, like a peroxide, or an azo compound, is used as catalyst. In spite of the nature of the catalyst, no oxidation is involved in the polymerization mechanism, and polymerization is initiated through cleavage of the catalyst into free radicals. This type of polymerization requires heat. In cationic polymerization, a Lewis acid or a Bronsted acid which provides protons, is the catalyst. Acids cannot be used in many applications because of their corrosive effects. Lewis acids tend to be hydrolytically unstable.

Vinyl amino compounds can often be polymerized by heating alone without a catalyst. In such case, however, it is recommended that an accelerator be employed to speed up the reaction. In this connection, halogens, halides, oxygen, sulfur and sulfur compounds have been suggested as accelerators in thermal polymerization (U.S. Patent No. 2,072,465).

It is the principal object of the present invention to provide a novel method for polymerizing vinyl amino compounds.

It is another object of the present invention to provide a novel method for initiating the polymerization of vinyl amino compounds without requiring heating and without the use of a corrosive or unstable catalyst.

Other objects will become apparent from a consideration of the following specification and the claims.

In polymerizing the vinyl amino compound monomer in accordance with the present invention, the monomer is contacted with a π complex-forming electron acceptor compound.

Such compounds, which are also referred to as charge transfer complex-forming electron acceptor compounds or charge transfer π complex-forming electron acceptor compounds, are already known as being those compounds which form a π complex with an amine. It has been found that such compounds initiate a rapid polymerization of the vinyl amino compound monomers at relatively low temperatures; that is, at temperatures at which with the monomer alone no significant self-sustaining polymerization of the monomer is initiated.

According to the present invention high yields of polymer are obtained in short periods of time (a matter of minutes) at temperatures even at room temperature or below. It is theorized that a new polymerization mechanism is involved. Thus, although water retards polymerization according to the present method as it does in cationic polymerization of vinyl amino compounds using an acid catalyst, thiophene, which is known to retard cationic polymerization of vinyl amino compounds, has no apparent effect on the polymerization according to the present method. Nor is the polymerization according to the present method influenced by the presence of a conventional peroxide free-radical polymerization catalyst. In addition, the present polymerization is insensitive to oxygen whereas in free-radical polymerization the rate of polymerization and the molecular weight of the polymer are affected by oxygen. Thus, it is believed that free radical catalysis is not involved. Moreover, styrene, which is readily polymerized by all previously known mechanisms, and acrylonitrile, which is readily polymerized by free radical- or anionic polymerization mechanisms, may actually be used as solvents in the present method without undergoing any polymerization. I believe, therefore, that the mechanism involved is one of radical-cation addition polymerization in which the π complex-forming electron acceptor compound accepts an electron from the vinyl amino compound monomer to form a π complex (or charge transfer complex) which in turn dissociates into a Wurster ion of the monomer. The Wurster ion of the monomer, according to this theory, is the 1 electron oxidation product of the monomer, and it, then, initiates the polymerization.

Although the foregoing is a theoretical attempt to explain the mechanism of the present polymerization, to which theory I do not feel compelled to be bound, it will be seen from the following that sufficient representative widely varying types of π complex-forming electron acceptor compounds have been used successfully as to support the view that the mechanism does involve formation of a Wurster ion of the monomer and, hence, that any π complex-forming electron acceptor compound will serve to initiate the polymerization.

As is well known, π complex-forming electron acceptor compounds are organic compounds capable of forming a π complex with, for example, N,N'-tetramethyl p-phenylenediamine. The π complex, as also known, is a combination of the amine and the π complex-forming electron acceptor compound in which the bonding involves p orbitols only, that is a bond between the p bonds of the amine and the π complex-forming electron acceptor compound. A single test for selecting π complex-forming electron acceptor compounds is to mix, at room temperature, the selected organic compound and N,N'-tetramethyl p-phenylenediamine in a non-polar solvent, like benzene. The π complex is darkly colored, usually an intense blue or green, and often forms as a precipitate. This can be identified as a π complex: spectroscopically, by the presence of charge transfer absorption bands in the spectrum; and by means of X-rays, which show a stack of alternating molecules of N,N'-tetramethyl p-phenylenediamine and π complex-forming electron acceptor compound.

The π complex-forming electron acceptor compounds, as presently known, comprise the quinones; trichloroacetonitrile; 1,3,5-trinitrobenzene; 1-chloro-2,4-dinitrobenzene; tetranitromethane; ethylene substituted with electron-withdrawing groups like trichloroethylene, tetrachloroethylene, tetracyanoethylene, and the like. The quinones are probably the most important type and these include compounds having the quinoid structure and having a single benzene ring, e.g. the benzoquinones, as well as those having two or more fused benzene rings, e.g. the naphthaquinones and the anthraquinones. The quinone may be unsubstituted or contain substituents on ring carbon atoms, such as alkyl groups containing from 1 to 3 carbon atoms, hydroxyl groups, halogens and cyano groups. Examples of these are: o- and p-benzoquinone, p-chloranil, o-chloranil, p-bromanil, p-iodanil, 2,3-dichloro - 5,6 - dicyanobenzoquinone, duroquinone, naphthaquinone, anthraquinone, 1,4,5,8-tetrachloroanthraquinone, tetracyanoquinodimethane, and the like. The preferred $\pi$ complex-forming electron acceptor compounds are those having an oxidation potential higher than and a reduction potential lower than that of p-benzoquinone. It will be noted that the foregoing compounds differ markedly as to structure and chemical grouping. This is not material since the ability of a compound to accept electrons from aromatic amines to form a $\pi$ complex therewith—and, hence to initiate the polymerization mechanism of the present invention, involves reduction potential. A source of the $\pi$ complex-forming electron acceptor compound, other than the free compound itself, may be a Wurster salt thereof which is in equilibrium with the compound.

The present method, as stated, is applicable to the polymerization of vinyl amino compounds. Such compounds are those in which a vinyl group is attached, either directly or conjugatedly through double bonds, to an amino group. In N-vinyl compounds, like N-vinyl carbazole, N-vinyl pyrrole, N-vinyl indole, and the like, the vinyl group is attached directly to the amino nitrogen, whereas in the vinyl pyridines, like 2-vinyl pyridine and 4-vinyl pyridine, and in the amino styrenes, like p-(dimethylamino) styrene, O-(dimethylamino) styrene, and the like, the vinyl group is conjugated through double bonds to the amino group. Of the vinyl amino compounds, the N-vinyl compounds, and especially N-vinyl carbazole, are preferred monomers. N-vinyl carbazole polymers are particularly useful in the preparation of plastic dielectric products. Since these must be free of ions, and particularly acid, the present method is ideally suited to the preparation of such polymers.

Being a catalyst, the $\pi$ complex-forming electron acceptor compound will be effective in as little as trace amounts depending upon the water content of the polymerization medium. Since water retards the polymerization, the lower the water content, the less catalyst required. Thus, in a system substantially completely free of water (for example, less than 5 parts per million), as little as about 0.01%, by weight, of the $\pi$ complex-forming electron acceptor compound based on the weight of the monomer may be sufficient. However, with most commercial solvents, when a solvent is used, a minimum on the order of about 0.1% may be needed. Any amount above this may be used depending upon the particular application. For example, fibers or yarns impregnated with the vinyl amino compound monomer or a preformed film or coating of the monomers could be passed through a bath containing the catalyst or, when the catalyst is in vapor form, such as vaporized trichloroacetonitrile, through an atmosphere thereof. In such cases the catalyst may actually be present in the bath or atmosphere in an amount greatly in excess of the monomer present at the time contact is made between the two. When polymerization is carried out in solution, in accordance with the preferred embodiment, the concentration of catalyst will generally be between about 0.1 and about 5%, by weight, based on the weight of the monomer.

As far as the method is concerned, all that is necessary is that the vinyl amino compound monomer be contacted with the $\pi$ complex-forming electron acceptor compound. Thus, the polymerization may be carried out in the solid state by simply passing a solid monomer, for example as a preformed coating or impregnation, through a bath containing the catalyst, or through an atmosphere containing it. Such a bath or atmosphere should be substantially anhydrous. When the monomer is liquid, like the vinylpyridines, the catalyst may be added and mixed into it. Water-insoluble monomers, like N-vinyl carbazole, could be polymerized, in suspension, in water since, although water retards the polymerization, the water content in the monomer particles where polymerization takes place is low. In this emulsion type polymerization, the retarding effect of the water can be compensated for by increasing the time-temperature conditions and/or catalyst concentration. The present method may be, and preferably is, carried out in solution under substantially anhydrous conditions. In this case the solvent will be an anhydrous, aprotic liquid. Examples of suitable solvents are: acetonitrile, propionitrile, acrylonitrile, benzene, carbon tetrachloride, chloroform, methylene chloride, ethyl ether, thiophene, styrene, and the like. It will be noted that acrylonitrile and styrene are useful solvents for the present method. The former is readily polymerized by free radical- and anionic mechanisms and the latter is readily polymerized by all known mechanisms. Yet, neither is polymerized under the conditions of the present method. Since no solvent at all is needed, it will be obvious that the concentration of monomer when in solution is not critical and may vary widely.

The polymerization according to the present method will be carried out at a temperature at which, with the monomer alone; that is to say, without the $\pi$ complex-forming electron acceptor compound or any other catalyst, no significant polymerization would be initiated. Thermal polymerizations of vinyl amino compounds are normally carried out at temperatures above 60° C. For example, N-vinyl carbazole is usually heated above its melting point of 63° C. The polymerization of the present invention takes place rapidly at temperatures below 60° C. Room temperature (20–25° C.) is satisfactory, and temperatures as low as −40° C. have been used successfully. Generally, the temperature will be below 40° C.

In carrying out the polymerization, the vinyl amino compound monomer is simply contacted with the $\pi$ complex-forming electron acceptor compound. In solid state polymerization, this involves bringing together the solid monomer and the compound. When solution polymerization is carried out, the $\pi$ complex-forming electron acceptor compound may already be dissolved in the solvent at the time the monomer is added thereto, or the compound as such or in solution in the same or different anhydrous, aprotic solvent may be added to the solution of the monomer. The compound need not be readily soluble in the solution; for example, upon addition of solid p-chloranil to an acetonitrile solution of N-vinyl carbazole, streams of polymer can be seen forming and rising from the solid p-chloranil. Once polymerization has been initiated, it proceeds rapidly to completion or until arrested. If acetonitrile is used as the solvent in solution polymerization, the polymer eventually precipitates out. In other solvents of the type mentioned, the polymer remains in solution, and polymerization may be arrested by adding the polymer solution to a liquid, like methanol, which strongly retards polymerization and in which the polymer is not soluble. In either case, the precipitated polymer can be recovered, as by filtration, and washed, for example with acetonitrile and acetone, to remove unreacted monomer.

The present invention will be more readily understood from a consideration of the following specific examples which are given for the purpose of illustration only and are not intended to limit the scope of the invention in any way.

*Example I*

In 5 ml. of acetonitrile, at 25° C., are dissolved 0.2 g. of N-vinyl carbazole. Five minutes after the addition of 0.01 g. of 2,3-dichloro-5,6-dicyanobenzoquinone, polymerization is completed and the polymer forms as a precipitate. The polymer is filtered and washed with a mixture of acetonitrile and acetone. It is found to have a molecular weight of 4350.

Example II

In 5 ml. of acetonitrile, at 25° C., are dissolved 0.2 g. of N-vinyl carbazole. Twenty minutes after the addition of 2 ml. of trichloroacetonitrile, polymerization is completed and the polymer forms as a precipitate. The polymer, after filtering and washing with a mixture of acetonitrile and acetone, has a molecular weight of 3890.

Example III

In 5 ml. of acetonitrile, at 25° C. are dissolved 0.2 g. of N-vinyl carbazole. Five minutes after the addition of 0.01 g. of o-chloranil, polymerization is completed and the polymer forms as a precipitate. The polymer is recovered by filtration and washed with acetonitrile and acetone.

Example IV

Example III is repeated, using 0.2 g. of N-vinyl pyrrole instead of N-vinyl carbazole, with comparable results.

Example V

In 5 ml. of methylene chloride, at 25° C. are dissolved 0.2 g. of N-vinyl carbazole. Thirty minutes after the addition of 0.01 g. of p-chloranil, the mixture is added to 100 ml. methanol to arrest polymerization and precipitate the polymer. The polymer is recovered by filtration and washed with acetonitrile and acetone.

Example VI

Example V is repeated, using 0.2 g. of N-vinyl indole instead of N-vinyl carbazole, with comparable results.

Example VII

Example V is repeated using 0.2 g. of p-(dimethylamino) styrene. Polymerization is completed in twenty minutes.

Example VIII

In 5 ml. of acetonitrile, at 25° C., are dissolved 0.2 g. of N-vinyl carbazole. Five minutes after the addition of 0.01 g. of p-bromanil, polymerization is completed and the polymer forms as a precipitate. The polymer is recovered by filtration and washed with acetonitrile and acetone.

Example IX

In 5 ml. of acetonitrile, at 25° C., are dissolved 0.2 g. of N-vinyl carbazole. Fifteen minutes after the addition of 0.01 g. of 1,4,5,8-tetrachloroanthraquinone polymerization is completed and the polymer forms as a precipitate. The polymer is recovered by filtration and washed with acetonitrile and acetone.

Example X

In 5 ml. of acetonitrile, at 25° C., are dissolved 0.2 g. of N-vinyl carbazole. Ten minutes after the addition of 0.01 g. of 7,7,8,8-tetracyanoquinodimethane, polymerization is completed and the polymer is recovered by filtration and washed with acetonitrile and acetone.

Example XI

In 5 ml. of acetonitrile, at 25° C., are dissolved 0.2 g. of N-vinyl carbazole. Five minutes after the addition of 0.01 g. of tetracyanoethane polymerization is completed and the polymer forms as a precipitate. The polymer is recovered by filtration and washed with acetonitrile and acetone.

Example XII

In 5 ml. of acetonitrile, at 25° C., are dissolved 0.2 g. of 4-vinylpyridine. Five minutes after the addition of 0.01 g. of 7,7,8,8-tetracyanoquinodimethane, polymerization is completed and the polymer forms as a precipitate. The polymer is recovered by filtration and washed with acetonitrile and acetone.

Example XIII

To 5 ml. of 4-vinylpyridine are added 0.01 g. of p-chloranil. After five minutes, at a temperature of 38° C., polymerization is arrested by adding the mass to a 1 normal aqueous solution of sodium hydroxide with stirring. The precipitated polymer is recovered by filtration.

Modification is possible in the selection of monomer, catalyst and solvent, and in proportions thereof, as well as in the particular techniques and procedures employed without departing from the scope of the present invention.

What is claimed is:

1. In the polymerization of a vinyl amino compound monomer selected from the group consisting of heterocyclic and aromatic vinyl amino compound monomers in which a vinyl group is attached directly to an amino group and heterocyclic and aromatic vinyl amino compound monomers in which a vinyl group is attached to an amino group conjugatedly through double bonds, the improvement which comprises contacting said monomer with an organic $\pi$ complex-forming electron acceptor compound having an oxidation potential higher than and a reduction potential lower than that of p-benzoquinone and capable of forming, in benzene at room temperature, a dark colored $\pi$ complex with N,N'-tetramethyl p-phenylenediamine identifiable spectroscopically by the presence of charge transfer absorption bands in the spectrum.

2. The method of claim 1 wherein said monomer is contacted with said $\pi$ complex-forming electron acceptor compound at a temperature below 60° C. at which, in the absence of said compound, no self-sustaining polymerization of said monomer is initiated.

3. The method of claim 2 wherein the temperature is below about 40° C.

4. The method of claim 3 wherein the temperature is not substantially above room temperature.

5. The method of claim 1 wherein said vinyl amino compound is an N-vinyl compound.

6. The method of claim 5 wherein said N-vinyl compound is N-vinyl carbazole.

7. The method of claim 5 wherein said N-vinyl compound is N-vinyl pyrrole.

8. The method of claim 5 wherein said N-vinyl compound is N-vinyl indole.

9. The method of claim 1 wherein said vinyl amino compound is a vinyl pyridine.

10. The method of claim 1 wherein said vinyl amino compound is an amino styrene.

11. In the polymerization of a vinyl amino compound monomer selected from the group consisting of heterocyclic and aromatic vinyl amino compound monomers in which a vinyl group is attached directly to an amino group and heterocyclic and aromatic vinyl amino compound monomers in which a vinyl group is attached to an amino group conjugatedly through double bonds, the improvement which comprises contacting said monomer with an organic $\pi$ complex-forming electron acceptor quinone having an oxidation potential higher than and a reduction potential lower than that of p-benzoquinone and capable of forming, in benzene at room temperature, a dark colored $\pi$ complex with N,N'-tetramethyl p-phenylenediamine identifiable spectroscopically by the presence of charge transfer absorption bands in the spectrum.

12. The method of claim 11 wherein said quinone is a halogen-substituted quinone.

13. The method of claim 12 wherein said quinone is a chloranil.

14. The method of claim 12 wherein said quinone is a bromanil.

15. The method of claim 12 wherein said quinone is an anthraquinone.

16. The method of claim 15 wherein said anthraquinone is tetrachloroanthraquinone.

17. The method of claim 11 wherein said quinone is a quinodimethane.

18. The method of claim 17 wherein said quinodimethane is tetracyanoquinodimethane.

19. In the polymerization of a vinyl amino compound monomer selected from the group consisting of heterocyclic and aromatic vinyl amino compound monomers in which a vinyl group is attached directly to an amino group and heterocyclic and aromatic vinyl amino compound monomers in which a vinyl group is attached to an amino group conjugatedly through double bonds, the improvement which comprises contacting said monomer with an organic π complex-forming electron acceptor ethylene substituted with electron-withdrawing groups having an oxidation potential higher than and a reduction potential lower than that of p-benzoquinone and capable of forming, in benzene at room temperature, a dark colored π complex with N,N'-tetramethyl p-phenylenediamine identifiable spectroscopically by the presence of charge transfer absorption bands in the spectrum.

20. In the polymerization of a vinyl amino compound monomer selected from the group consisting of heterocyclic and aromatic vinyl amino compound monomers in which a vinyl group is attached directly to an amino group and heterocyclic and aromatic vinyl amino compound monomers in which a vinyl group is attached to an amino group conjugatedly through double bonds, the improvement which comprises contacting said monomer, in solution in an anhydrous, aprotic solvent therefor selected from the group consisting of acetonitrile, propionitrile, acrylonitrile, benzene, carbon tetrachloride, chloroform, methylene chloride, ethyl ether, thiophene and styrene, with an organic π complex-forming electron acceptor compound having an oxidation potential higher than and a reduction potential lower than that of p-benzoquinone and capable of forming, in benzene at room temperature, a dark colored π complex with N,N'-tetramethyl p-phenylenediamine identifiable spectroscopically by the presence of charge transfer absorption bands in the spectrum.

References Cited

Scott et al.: Tetrahedron Letters No. 17, pp. 1073–8 (August 1963).

JOSEPH L. SCHOFER, *Primary Examiner.*

H. WONG, *Assistant Examiner.*